United States Patent
Uchida et al.

(10) Patent No.: US 7,437,022 B2
(45) Date of Patent: Oct. 14, 2008

(54) IMAGE DATA PROCESSING APPARATUS, AND IMAGE DATA REGISTRATION APPARATUS AND ATTRIBUTE INFORMATION REGISTRATION APPARATUS PERTAINING THERETO

(75) Inventors: Hisashi Uchida, Kuze-gun (JP); Takashi Kamada, Sakai (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 552 days.

(21) Appl. No.: 11/007,231

(22) Filed: Dec. 9, 2004

(65) Prior Publication Data

US 2006/0059198 A1    Mar. 16, 2006

(30) Foreign Application Priority Data

Sep. 1, 2004    (JP)    ............................. 2004-254007

(51) Int. Cl.
 *G06K 9/54* (2006.01)
 *G06F 12/00* (2006.01)
 *G06K 9/60* (2006.01)

(52) U.S. Cl. ...................................... 382/305; 707/200
(58) Field of Classification Search ................. 382/305, 382/307; 707/200, 204, 205; 709/203
See application file for complete search history.

(56) References Cited

U.S. PATENT DOCUMENTS

| | | | | |
|---|---|---|---|---|
| 5,403,639 | A * | 4/1995 | Belsan et al. | ................ 707/204 |
| 7,053,936 | B2 * | 5/2006 | Imura et al. | ............... 348/231.2 |
| 7,268,898 | B2 * | 9/2007 | Suenaga et al. | ............. 358/1.13 |
| 2003/0200234 | A1 * | 10/2003 | Koppich et al. | ............. 707/203 |
| 2004/0189827 | A1 * | 9/2004 | Kim et al. | ................ 348/231.4 |
| 2007/0112874 | A1 * | 5/2007 | Carol et al. | .................. 707/200 |

FOREIGN PATENT DOCUMENTS

| | | |
|---|---|---|
| JP | 6-175842 | 6/1994 |
| JP | 2002-057737 | 2/2002 |
| JP | 2002-328793 | 11/2002 |
| JP | 2003-099312 | 4/2003 |
| JP | 2003-241956 | 8/2003 |
| JP | 2003-266809 A | 9/2003 |
| JP | 2003-271437 A | 9/2003 |
| JP | 2003-326776 | 11/2003 |
| JP | 2004-152262 A | 5/2004 |

OTHER PUBLICATIONS

Maurice J. Bach, The Design of the Unix Kernel, The Design of the Unix™ Operating System, Kyoritsu Shuppan Co., Ltd., Jun. 10, 1991, First Edition, pp. 51-74 (paperback 199700271001).
Translation of Japanese Office Action dated Jul. 3, 2007.
Notification of Reasons for Refusal issued in corresponding Japanese patent Application No. 2004-254007, mailed May 13, 2008, and translation thereof.

* cited by examiner

*Primary Examiner*—Yon Couso
(74) *Attorney, Agent, or Firm*—Buchanan Ingersoll & Rooney PC

(57) ABSTRACT

An image data processing apparatus that restricts the output or transfer of image data stored in a folder comprising a box to another box. In order to improve the maintenance of confidentiality, the image data processing apparatus includes multiple folders or boxes 141, 142, non-volatile storage means 141 that stores image data and attribute information that prescribes the handling of the image data in one of the folders, and control means 17 that controls the handling of the image data based on the attribute information when an instruction to process image data stored in a folder 141, 142 is received from the user.

4 Claims, 10 Drawing Sheets

| | JOB ID | 1 |
|---|---|---|
| IMAGE FORMING PARAMETER INFORMATION | JOB NAME | Color Print |
| | USER NAME | x x x |
| | NUMBER OF COPIES | 2 |
| | PAPER SIZE | A4 |
| | COLOR DESIGNATION | COLOR |
| | ⋮ | ⋮ |
| ATTRIBUTE INFORMATION | INTER-BOX TRANSFER | PROHIBITED |
| | INTER-BOX COPYING | PERMITTED |
| | PRINTING | PERMITTED |
| | OUTPUT TO EXTERNAL DEVICE | PROHIBITED |

Fig. 5

| | | |
|---|---|---|
| IMAGE FORMING PARAMETER INFORMATION | JOB ID | 1 |
| | JOB NAME | Color Print |
| | USER NAME | × × × |
| | NUMBER OF COPIES | 2 |
| | PAPER SIZE | A4 |
| | COLOR DESIGNATION | COLOR |
| | ⋮ | ⋮ |
| ATTRIBUTE INFORMATION | INTER-BOX TRANSFER | PROHIBITED |
| | INTER-BOX COPYING | PERMITTED |
| | PRINTING | PERMITTED |
| | OUTPUT TO EXTERNAL DEVICE | PROHIBITED |

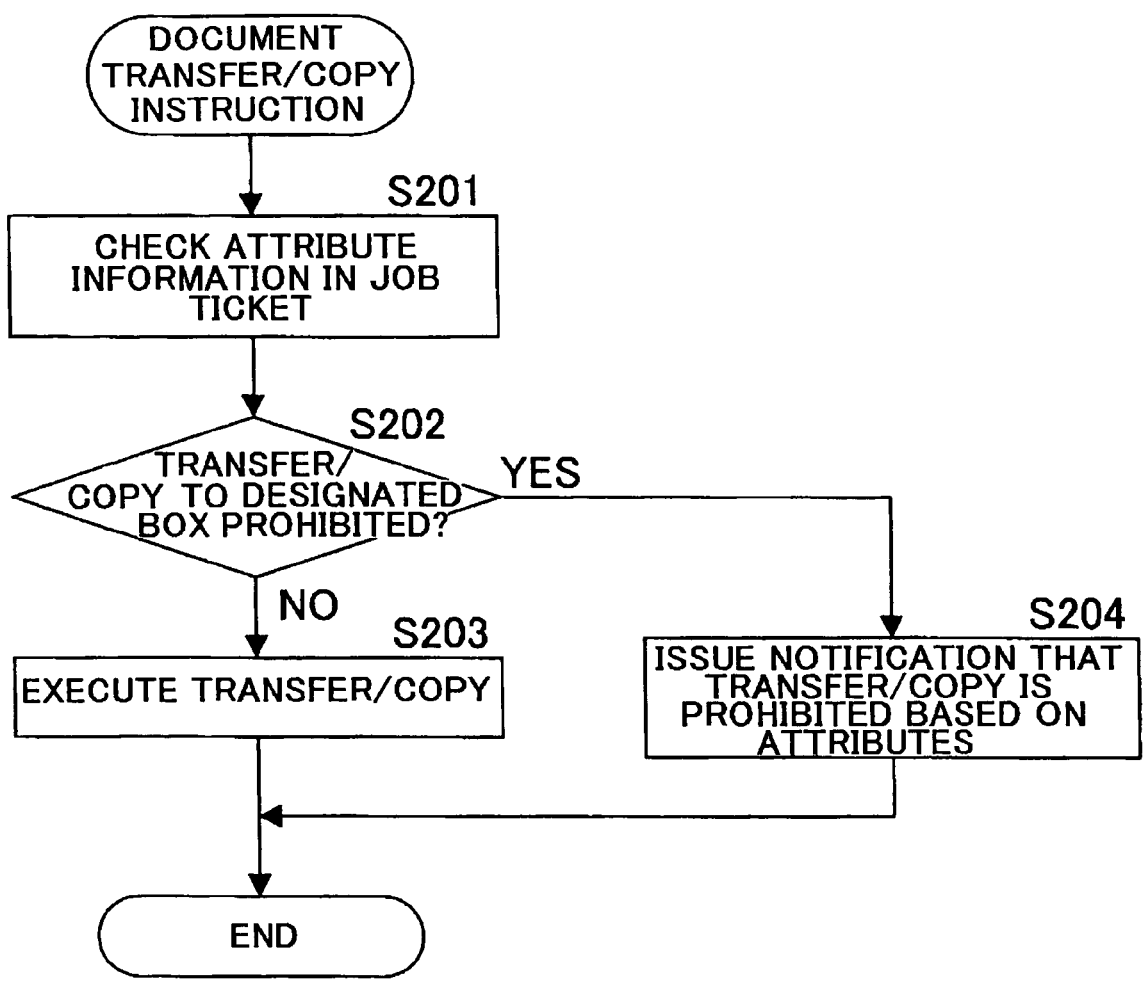

IMAGE DATA PROCESSING APPARATUS, AND IMAGE DATA REGISTRATION APPARATUS AND ATTRIBUTE INFORMATION REGISTRATION APPARATUS PERTAINING THERETO

This application is based on Japanese Patent Application No. 2004-254007 filed in Japan on Sep. 1, 2004, the entire content of which is hereby incorporated by reference.

BACKGROUND OF THE INVENTION

1. Field of the Invention

The present invention relates to an image data processing apparatus applied in an MFP (Multifunction Peripheral) or the like having a box function, as well as to an image data registration apparatus that registers image data and to an attribute information registration apparatus that registers attribute information in this image data processing apparatus.

2. Description of the Related Art

In general, in an image data processing apparatus having a box function, such as an MFP having a copier function, a printer function, a fax function and the like, security management to maintain confidentiality is carried out for highly confidential documents (image data) stored in a box comprising a folder in the storage device.

In the conventional art, to carry out this type of security management, a technology has been proposed wherein attributes that include the presence of an electronic watermark are configured for a folder, and a watermark is created based on such a folder attribute when a file stored in that folder is to be printed (Japanese Patent Laid-Open No. 2003-241956).

Furthermore, a technology is also known wherein the shared folder on a file sharing server is configured to include information regarding terminals that are prohibited from uploading updated files to the shared folder, and when such a terminal downloads a file, it also downloads this control information such that the terminal is prohibited from uploading the same file if the file is updated using such terminal (Japanese Patent Laid-Open No. 2003-99312).

However, in the conventional art including these examples, only access to the boxes themselves is restricted, and once a box is accessed, any document stored therein can be printed, output to any external device via e-mail or FTP (File Transfer Protocol), or copied or transferred to a different box, in which case the confidentiality of the document can no longer be maintained.

Moreover, the boxes include a public box that is used in common by all users, such that anyone can freely print any of the documents stored therein, output them via e-mail or FTP transmission, or copy or transfer such documents to another box. However, it is sometimes desired to prohibit the output of such documents stored in a public box via e-mail or FTP, restrict the parties that can receive such output, or prohibit the transfer or copying of the documents to another box. However, these desires cannot be accommodated under the conventional art.

OBJECT AND SUMMARY

An object of the present invention is to resolve the problems described above by providing an image data processing apparatus that can restrict the output of image data stored in a folder comprising a box or the transfer of such image data to a different box and thereby improve the maintenance of confidentiality thereof, as well as to provide an image data registration apparatus that registers image data and an attribute information registration apparatus that registers attribute information in this image data processing apparatus.

The above object is realized via the construction described below.

An image data processing apparatus comprising: a memory that has a plurality of folders, and stores in any of the folders image data and attribute information that prescribes a handling of the image data while associating the image data and the attribute information; and controller that, in response to a user instruction to process the image data stored in any of the folders, controls the handling of the image data based on the attribute information.

According to this construction, when information that prescribes a handling of the image data as attribute information, the image data cannot be freely processed by a third party. Furthermore, because the attribute information is not prescribed for each box, but is rather prescribed for each set of image data, the handling of each set of image data can be restricted without regard to any access restrictions on the box, and because the handling of image data can be restricted even if the image data is stored in a public box, a high degree of security can be maintained for image data.

The attribute information is information regarding whether or not the copying or transferring of image data to a different folder is prohibited, and the controller controls, in response to the user instruction to copy or transfer the image data, whether or not the image data should be copied or transferred to the different folder based on the attribute information.

According to this construction, by setting as attribute information the prohibition against copying or transfer of image data to a different folder, a third party can be effectively prevented from copying or transferring the image data to a different folder without authorization.

The image data processing apparatus of the present invention further comprising: an outputting unit that outputs the image data, wherein the attribute information is information regarding whether or not the output of the image data by the outputting unit is prohibited, and the controller controls, in response to the user instruction to output image data by the outputting unit, whether or not output is prohibited based on the attribute information.

According to this construction, by setting as attribute information for image data the prohibition against output by the outputting unit, a third party can be effectively prevented from outputting the image data without authorization.

The outputting unit is an image forming unit that prints the image data on a recording paper, and the attribute information is information regarding whether or not print by the image forming unit of the image data onto the recording paper is prohibited.

According to this construction, by setting as attribute information the prohibition against image formation by the image forming means, a third party can be effectively prevented from performing image formation based on image data without authorization.

The outputting unit is a transmission unit that transmits image data to an external recipient, and the attribute information is information regarding whether or not the transmission of image data to the external recipient by the transmission unit is prohibited.

According to this construction, setting as attribute information the prohibition against transmission of image data by the transmission unit, a third party can be effectively prevented from transmitting image data to an external device without authorization.

Furthermore, the outputting unit outputs the image data based on a output parameter, and the attribute information is appended to the output parameter.

According to this construction, attribute information can be reliably associated with image data.

In addition, from a different perspective, the present invention is an image data registration apparatus that registers image data in a folder within a image data processing apparatus, the image data registration apparatus comprising: an attribute information setting unit that configures attribute information that prescribes a handling of the image data; and a registration unit that associates the image data and the attribute information, and registers the image data and the attribute information in the folder within the image data processing apparatus.

According to this construction, image data and attribute information that prescribes the handling of this image data can be stored in a folder within the image data processing apparatus while being associated with each other.

Furthermore, the image data registration apparatus of the present invention has an output parameter input unit that inputs a output parameter used when image data to be registered is output by a outputting unit of the image data processing apparatus, wherein the registration unit appends the attribute information to the output parameter, and registers the image data and the output parameter in the folder within the image data processing apparatus.

According to this construction, image data and attribute information can be reliably associated and stored in a folder.

Stated from a different perspective, the present invention is an attribute information registration apparatus that registers attribute information in a folder having image data in a image data processing apparatus, the attribute information registration apparatus comprising: an image data designation unit that designates the image data stored in the folder of the image data processing apparatus; an attribute information setting unit that configures attribute information that prescribes a handling of the image data designated by the image data designation unit; and an attribute information registration unit that associates to the image data designated by the image data designation unit, and registers the attribute information in the folder.

According to this construction, attribute information can be subsequently registered for image data that is already stored in a folder.

BRIEF DESCRIPTION OF THE DRAWINGS

These and other objects and features of the present invention will become clear from the following description taken in conjunction with the preferred embodiments thereof with reference to the accompanying drawings, in which:

FIG. 5 is an explanatory drawing showing attribute information appended to image formation parameters;

FIG. 10 is a flow chart showing the sequence of operations performed when transfer or copying of a document stored in a box to a different box is instructed.

DETAILED DESCRIPTION OF THE PREFERRED EMBODIMENTS

An embodiment of the present invention will be described below based on drawings.

Figure 1:
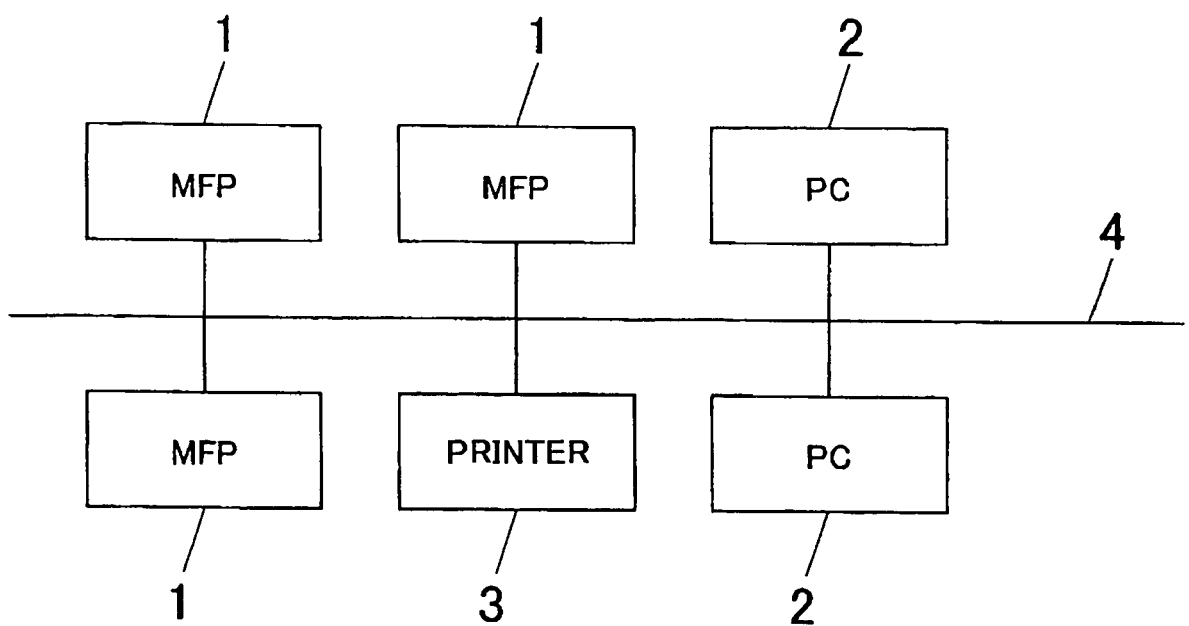
FIG. 1 is a block diagram showing an image transmission system that includes an MFP that serves as an image forming apparatus pertaining to an embodiment of the present invention.

FIG. 1 is a block diagram showing the construction of an image transmission system that includes an MFP that serves as an image data processing apparatus pertaining to an embodiment of the present invention.

This image transmission system includes multiple MFPs 1, . . . , multiple personal computers (hereinafter 'PCs') 2, . . . , comprising user terminals, and a printer 3, and these MFPs 1, . . . and PCs 2, . . . , and the printer 3 are interconnected over a network 4.

Figure 2:
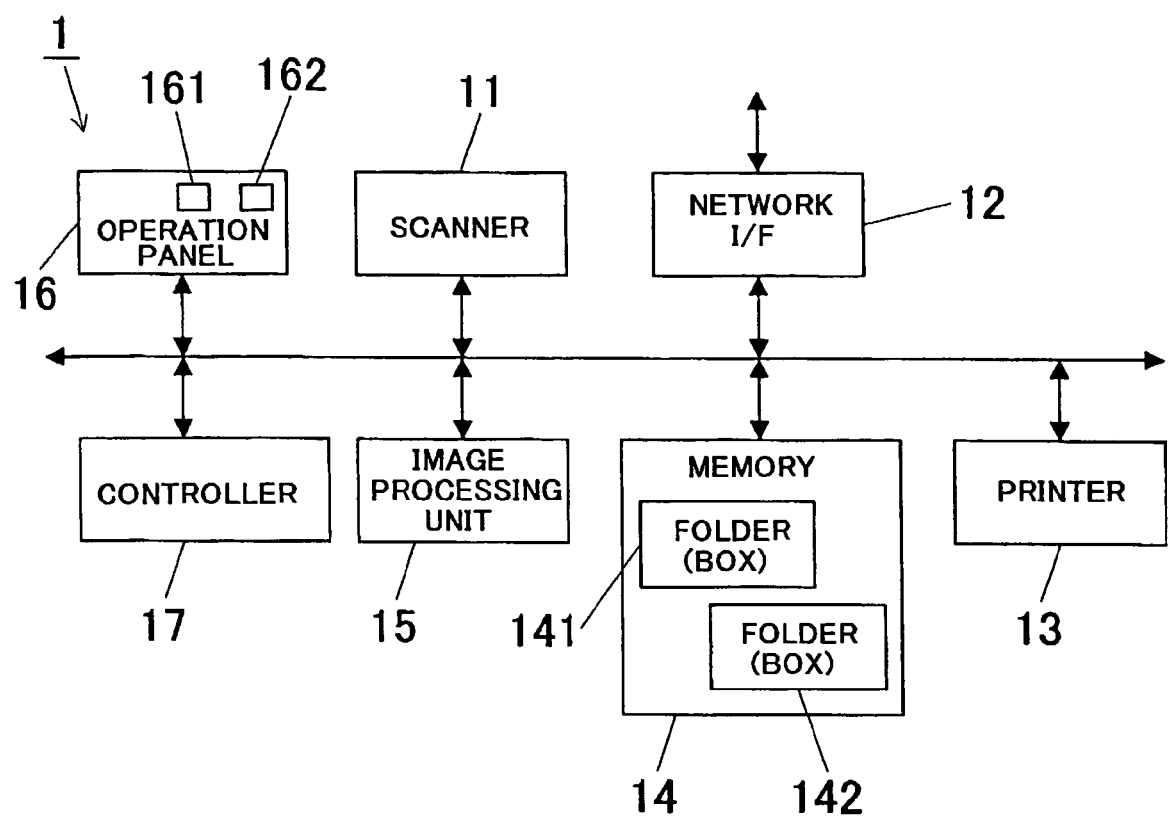
FIG. 2 is a block diagram showing the electrical construction of the MFP.

FIG. 2 is a block diagram showing the electrical construction of any MFP 1.

With reference to FIG. 2, the MFP 1 includes a scanner 11, a network interface (referred to as a 'network I/F' in the drawing) 12, a printer 13, a memory 14, an image processor 15, an operation panel 16 and a controller 17.

The scanner 11 reads an original document image and outputs image data for the read original document.

The network interface 12 is used to enable data to be sent and received to and from a PC 2 or other external device over the network 4, and in this embodiment, comprises, as one type of output unit, transmission unit that transmits image data to a prescribed external transmission recipient via e-mail or FTP. The transmission recipient may be designated by device name and IP address or subnet.

The printer 13 executes image formation (printing) onto recording paper of image data of an original document read by the scanner 11 or of image data stored in the memory 14, and in this example, comprises an image forming unit, which is one type of output unit.

Figure 4:
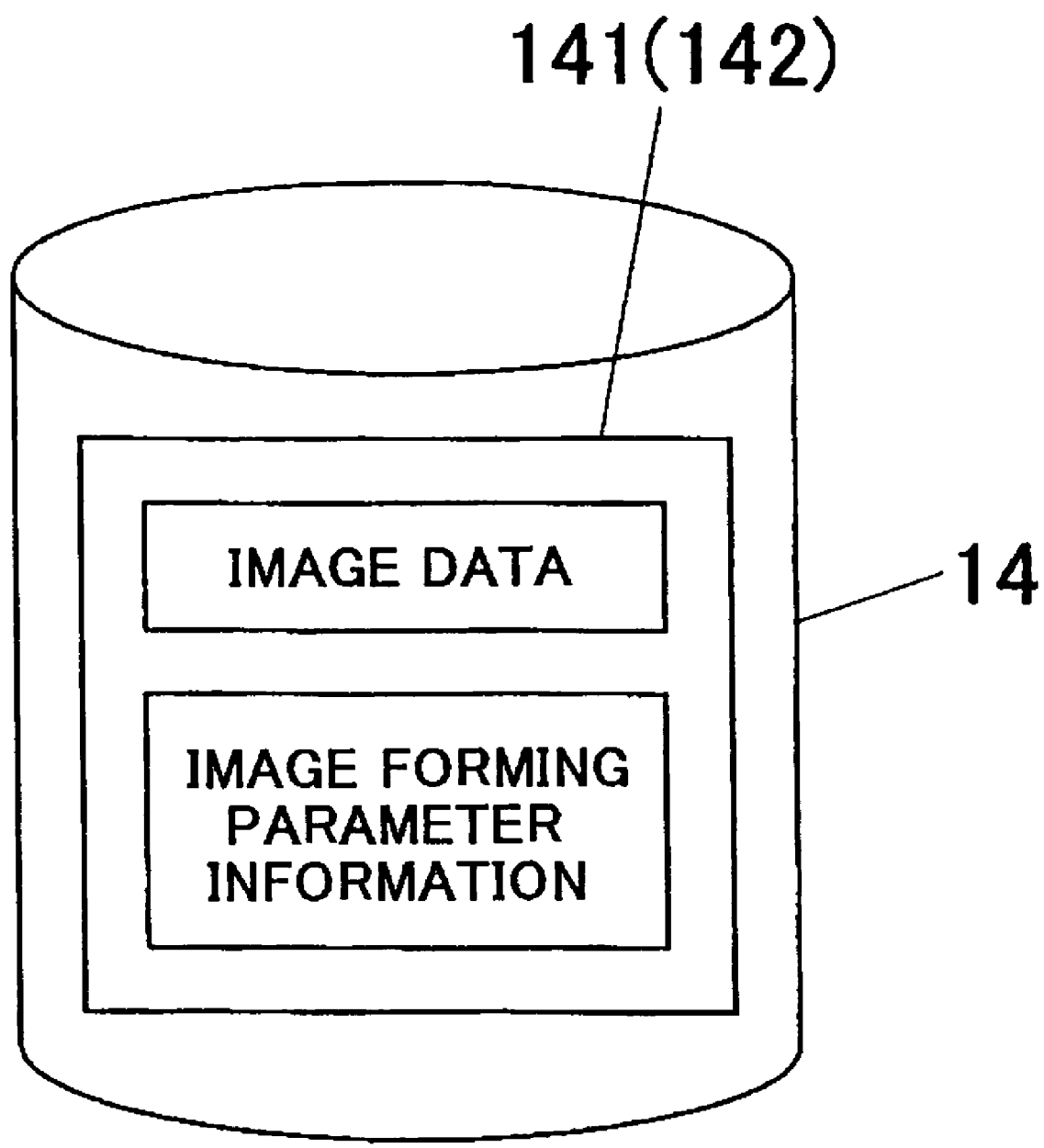
FIG. 4 is an explanatory drawing showing the stored contents of a folder, such as image data.

The memory 14 comprises a hard disk or the like, and has an area for multiple non-volatile folders 141, 142, . . . , which serve as boxes (folders shall hereinafter be referred to as 'boxes'). Each folder 141, 142, . . . stores documents comprising image data and output parameter information (hereinafter also 'job tickets'), as shown in FIG. 4. An example of output parameters includes the job ID, job name, user name, number of copies, paper size, color settings and other image forming parameters that are used when image data is output from the printer, as shown in FIGS. 4 and 5.

Furthermore, attribute information that prescribes the handling of the image data is appended to this output parameter information as shown in FIG. 5, and therefore each set of image data is stored in a folder 141, 142, . . . in association with its output parameter information and attribute information.

This attribute information may include such information as information regarding whether or not copying or transfer of the image data to different folders is prohibited, information regarding whether or not printing of the image data by the printer 13 is prohibited, and information regarding whether or not transmission of the image data to external transmission recipients via the network interface 12 is prohibited. Other examples of attribute information include information restricting the number of times the image data can be output or information prohibiting modification of the image forming parameters.

The image processor 15 executes prescribed image processing of image data for an original document read by the scanner 11.

The operation panel 16 has an operation key area 161 that includes various mode setting keys, a start button, a numeric key pad and the like, as well as a display 162 such as a liquid crystal display that can accept touch-key input. Using this operation panel 16, the user can input attribute information to be associated with image data as described below, or can designate image data already stored in the memory 14, instruct that the image data be transferred or copied to a different box 152, instruct that the image data be printed via the printer 13, or instruct that the image data be transmitted to an external transmission recipient via the network interface 12.

The controller 17 executes overall control of the MFP 1. For example, where image data and corresponding attribute information are input, the controller 17 associates such data and information and store them in a folder 141, 142, . . . of the memory 14, and where image data that is not associated with attribute information already resides in the folder 141, 142, . . . , the controller 17 stores in the folder 141, 142, . . . attribute information set by the user in association with the image data in response to a user instruction. The controller 17 also causes user-designated image data to be copied or transferred to a different folder 141, 142, . . . according to a user instruction, printed by the printer 13, or transmitted externally via the network interface 12.

When the image data is copied or transferred to a different folder 141, 142, . . . printed via the printer 13 or transmitted to an external transmission recipient where attribute information is set in association with this image data, the controller 17 controls the handling of the image data based on this attribute information.

In this embodiment, image data that is already stored in a folder 141, 142, . . . can be designated using the operation panel 16 and output parameters and/or attributes can be set in connection therewith, or existing attribute information can be edited. Editing of attribute information may be carried out only by the user that corresponds to a password set during image data registration and stored in association with the image data.

Image data for an original document read by the scanner 11, as well as output parameter information and attribute information set using the operation panel 16, can be registered in a designated registration box.

Figure 6:
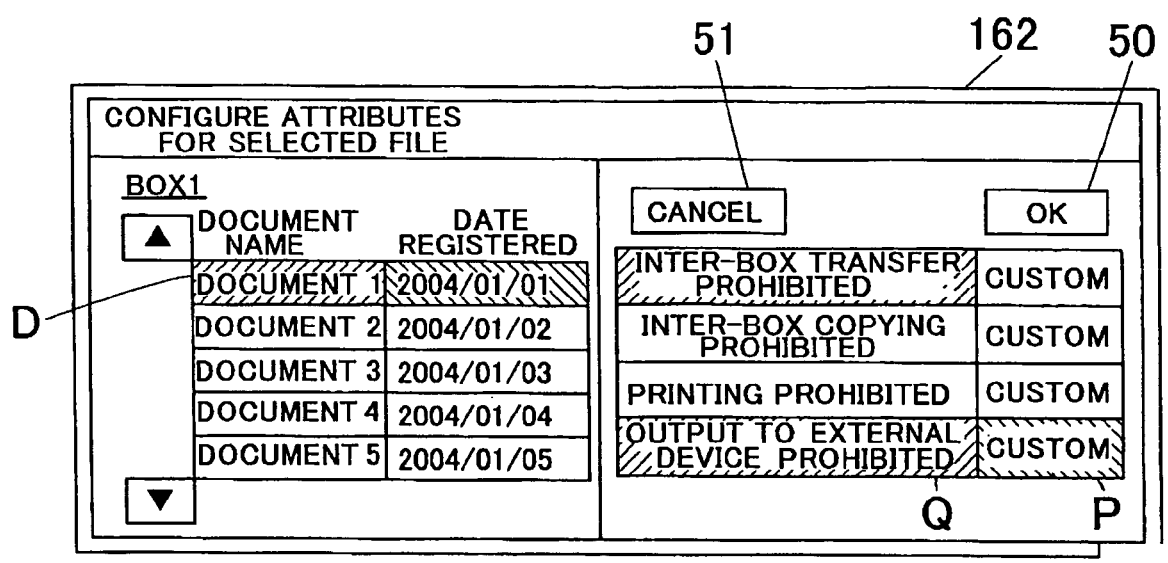
FIG. 6 is an explanatory drawing showing a setting screen used during attribute information registration.

FIG. 6 shows a setting screen displayed on the display 162 of the operation panel 16 where attribute information is to be configured and set for image data (i.e., a document) that already resides in a box 141, 142, . . . .

In FIG. 6, when 'Document 1', for example, is selected from within the box displayed in the document display area D, the selected 'Document 1' is displayed in a highlighted fashion, and attribute items Q are displayed. A highlighted-display area is indicated via diagonal hatching in FIG. 6 (as well as in FIGS. 7 and 8).

Attributes are configured by the user from among the displayed attribute options Q by selecting the desired options. The set option is displayed in a highlighted fashion. In this embodiment, the attributes 'Transfer between boxes prohibited' and 'External output prohibited' are set.

When an option that is not highlighted is selected, the option display changes to highlighted display, and when a highlighted-display option is selected, the option display changes to normal display.

When the 'OK' button 50 is selected, the settings are accepted, while if the 'Cancel' button 51 is selected, the setting screen is ended without the settings being accepted.

The 'Custom' button P is used in order to configure customized settings. It is used when carrying out configuration to prohibit or permit transfer to a specific box or prohibit or permit output to a specific external transmission recipient. Where custom settings are in place, the 'Custom' button P is displayed in a highlighted fashion.

Figure 7:
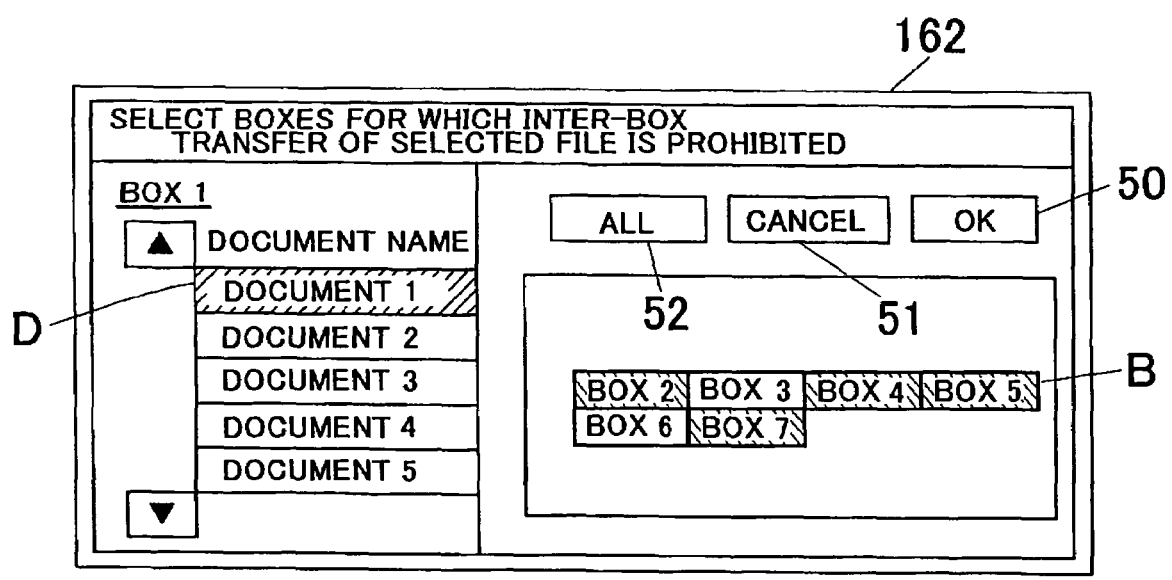
FIG. 7 is a different explanatory drawing showing a setting screen used during attribute information registration.

FIG. 7 shows a setting screen for the configuration of a custom setting to prohibit transfer between boxes.

In the box display area B in FIG. 7, the boxes displayed in a highlighted fashion are the boxes to which the transfer of Document 1 is prohibited.

If a box to which inter-box image data transfer is permitted (a box displayed normally) is selected, the display status changes to highlighted display and the box becomes a box to which image data transfer is prohibited.

If a highlighted box is selected, the display status changes to normal display and the box becomes a box to which image data transfer is permitted.

When the 'OK' button 50 is selected, the settings are accepted, while if the 'Cancel' button 51 is selected, the setting screen is ended without the settings being accepted. If the 'All' button is selected, all boxes can be set to prohibited or permitted. If setting is ended with transfer and copying to all boxes being either prohibited or permitted, the situation is handled as 'No custom settings'.

Figure 8:
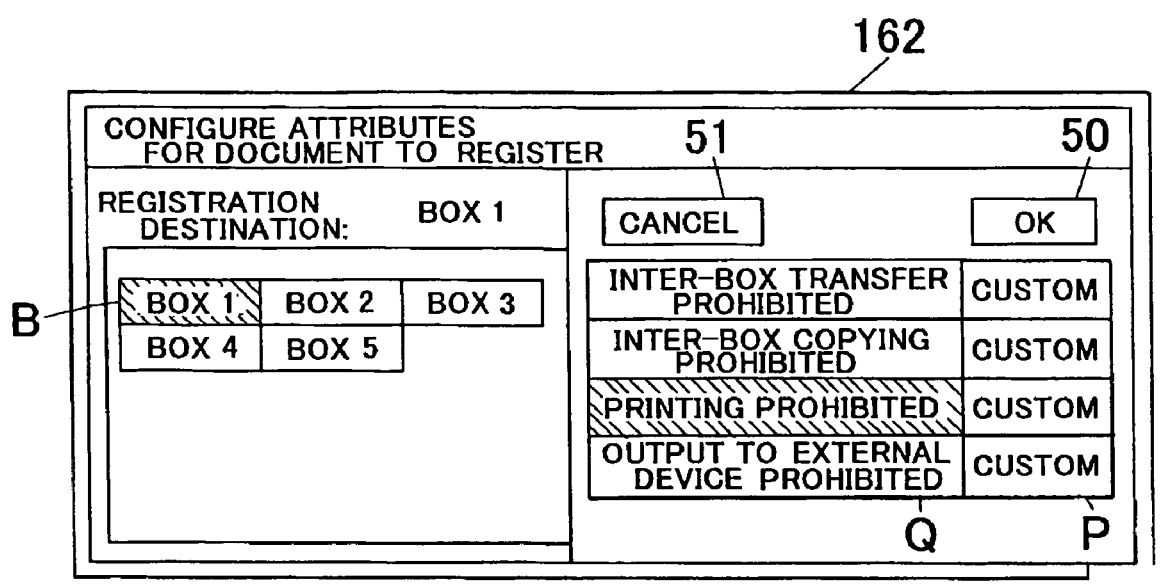
FIG. 8 is an explanatory drawing showing an attribute setting screen used during document registration.

FIG. 8 shows a registration screen displayed on the display 162 of the operation panel 16 where attribute information for image data for an original document read by the scanner 11 (i.e., a document) is to be configured and registered in a box.

When a desired box is designated as a registration target box from within the box display area B, that box changes to highlighted display and the attribute options Q are displayed. The user sets attributes by selecting the desired options from among the displayed attribute options Q. The set options are displayed in a highlighted fashion. In this embodiment, the 'Printing prohibited' attribute is set.

When an option that is not highlighted is selected, the display of such option changes to highlighted display, while if a highlighted option is selected, the display of such option changes to normal display.

If the 'OK' button 50 is selected, the image data read by the scanner 11 is registered in the designated box together with the configured attribute information. When this is done, if image output parameters not shown have been configured, the attribute information is appended to the output parameter information and registered together with the image data in the manner described above, as shown in FIG. 5. Furthermore, if the 'Cancel' button 51 is selected, the registration screen is ended without the settings being accepted.

The 'Custom' button P is selected when customized setting is to be carried out.

In the embodiment shown in FIGS. 6 through 8, configuration of attribute information for image data and registration (storage in a folder) of image data and attribute information were carried out using the operation panel 16, but such attribute information setting and image data registration may be performed via a PC 2.

Figure 3:
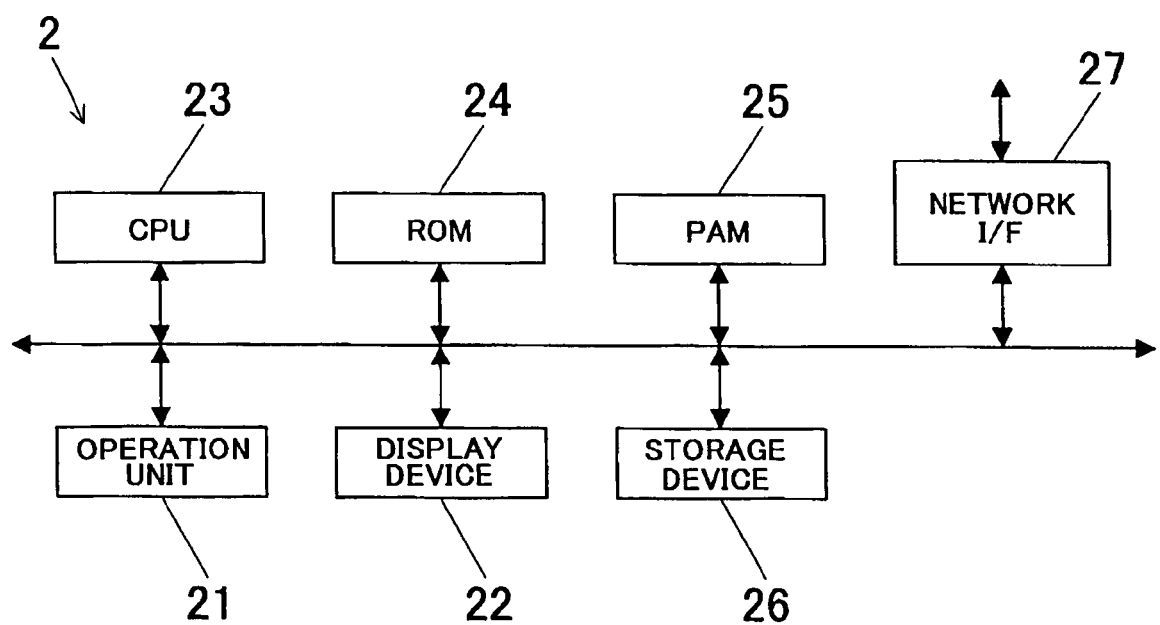
FIG. 3 is a block diagram showing the electrical construction of a PC.

FIG. 3 shows the construction of any of the PCs 2. The PC 2 includes an operation unit 21, a display device 22, a CPU 23, a ROM 24, a RAM 25, a storage device 26 and a network interface (shown as 'network I/F' in FIG. 3) 27.

The operation unit 21 comprises a keyboard and a mouse or the like, and the display device 22 comprises a liquid crystal display or the like. The CPU 23 performs overall control of the PC 2. The ROM 24 stores necessary data and programs and the RAM 25 provides a work area used when the PC executes a program.

The storage device 26 comprises a hard disk or the like, and stores data such as documents created by the user.

The network interface 27 is used to enable data to be sent and received to and from an MFP 1 or other external device over the network 4, and in this embodiment, functions as input means that inputs image data and attribute information to an MFP 1.

In order to register attribute information in association with image data that is already registered in a box 141, 142, ... using the PC 2, a setting screen similar to those shown in FIGS. 6 and 7 should be displayed on the display device 22 using certain driver software or the like to enable designation of a set of image data and configuration of attribute information via the operation unit 21. When the 'OK' button is clicked, the attribute information is sent and input to the MFP 1 via the network interface 27, whereupon the settings are registered.

Where document data or the like stored in the memory 14 of the PC 2 is to be registered in a box 141,142, ... of an MFP 1 together with its attribute information and job ticket, a job ticket such as that shown in FIG. 5 to which the attribute information is appended should be created and sent and input to the MFP 1 together with the document data. When this is done, it is also acceptable if a box designation screen similar to that shown in FIG. 8 is displayed on the display device 22 to enable designation of a box in which the data is to be registered.

As described above, because attribute information that restricts the handling of image data registered in a prescribed folder 141, 142 ... of the memory 14 is set in such image data via the operation panel 16 of the MFP 1 or the PC 2, unauthorized handling of the image data by a third party is prohibited and a high level of security is maintained for the image data.

Specifically, where the attribute information is information prohibiting transfer or copying of the image data to another box, transfer or copying by a third party to another box is prohibited, and where the attribute information is information prohibiting printing of the image data onto recording paper by the printer 13, such printing by a third party is prohibited. Where the attribute information is information prohibiting transmission of the image data to an external transmission recipient, such transmission by a third party is prohibited.

The operations carried out by the controller 17 of the MFP 1 when the handling of image data having associated attribute information is instructed by a third party will now be explained with reference to the flow charts of FIGS. 9 and 10. In the description below and the drawings, 'step' is abbreviated as 'S'.

Figure 9:
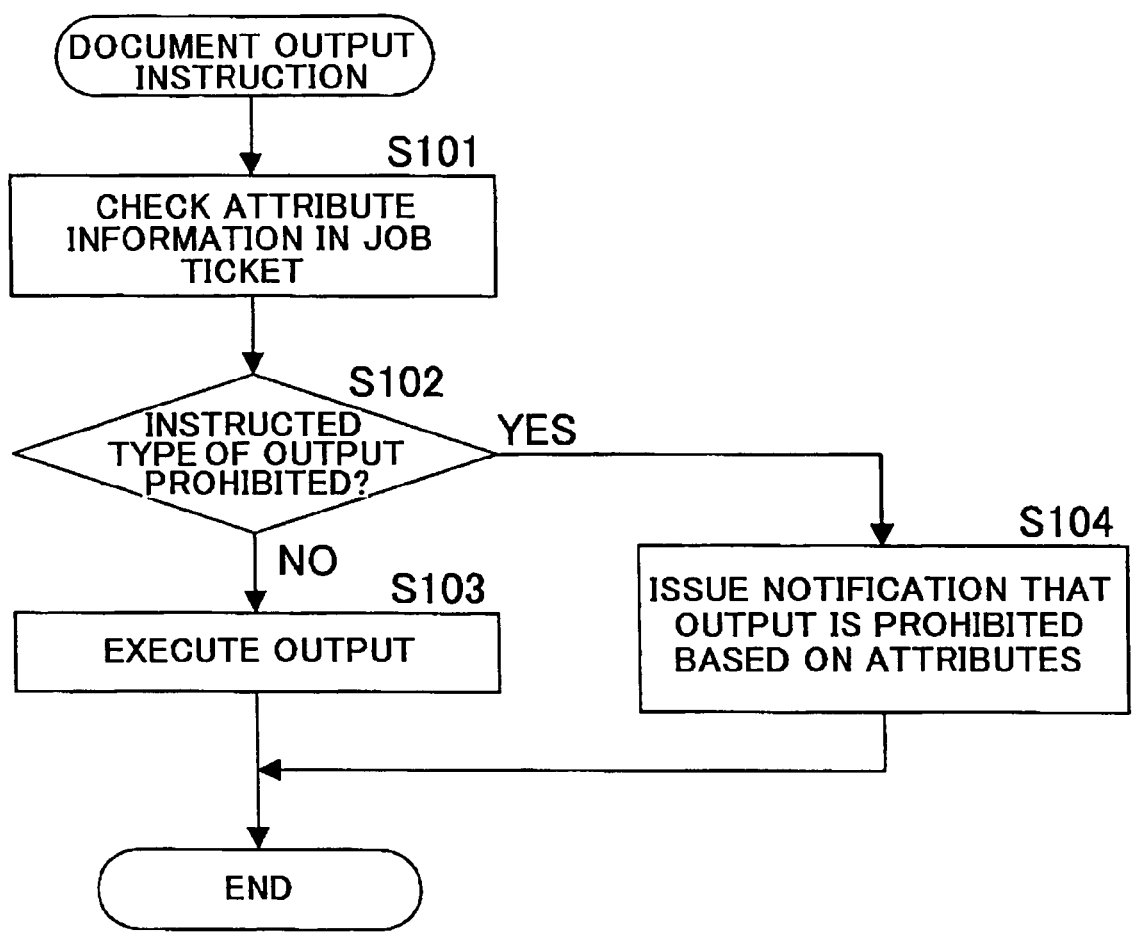
FIG. 9 is a flow chart showing the sequence of operations performed when output of a document stored in a box to an external device is instructed.

FIG. 9 is a flow chart showing the control process carried out by the controller 17 of the MFP 1 when the user issues an output instruction regarding a set of image data.

When the user designates a certain document stored in the box 141 from the operation panel 16 or from a PC 2 and instructs that the document be printed by the printer 13 or transmitted via the network interface 12, the controller 17 checks the attribute information in the job ticket for the designated image data in S101. It then determines in S102 whether or not the type of output instructed by the user is prohibited based on the attribute information, i.e., whether or not printing by the printer 13 or transmission via the network interface 12 is prohibited.

If the type of output for which the instruction was issued is not prohibited (NO in S102), the controller 17 carries out the output in S103 and ends the processing. If the type of output for which the instruction was issued is prohibited (YES in S102), the controller 17 does not carry out the specified output processing and displays on the display 162 of the operation panel 16 a message to the effect that 'output is prohibited based on the attribute information', or notifies the PC 2 accordingly, whereupon it ends processing.

Image data having attribute information prohibiting output is effectively prevented from being printed or transmitted to an external device without authorization by a third party.

The control carried out by the controller 17 of the MFP when the user instructs that the image data be transferred or copied to a different box will now be explained with reference to the flow chart of FIG. 10.

When the user designates via the operation panel 16 or a PC 2 a certain document stored in a box 141, 142, ... and a box to which the document is to be transferred or copied, and instructs that the designated document be transferred or copied to the designated box, the controller 17 checks the attribute information in the job ticket for the designated image data in S201. It then determines in S202 according to the attribute information whether or not transfer or copying to the designated box is prohibited.

Where transfer or copying to the designated box is not prohibited (NO in S202), the controller 17 executes transfer or copying in S203 in accordance with the instruction. Where transfer or copying to the designated box is prohibited (YES in S202), the controller 17 does not carry out the specified output processing, displays a message to the effect 'the output is prohibited based on the attribute information' on the display 162 of the operation panel 16, or notifies the PC 2 accordingly, and ends the processing.

In this fashion, image data having attribute information prohibiting transfer or copying to a different box is effectively prevented from being transferred or copied to a different box without authorization by a third party.

Although the present invention has been fully described in connection with the preferred embodiments thereof with reference to the accompanying drawings, it is to be noted that various changes and modification are apparent to those skilled in the art. Such changes and modifications are to be understood as included within the scope of the present invention as defined by the appended claims unless they depart therefrom.

What is claimed is:

1. An image data registration apparatus that registers image data in a folder within an image data processing apparatus, the image data registration apparatus comprising:

an attribute information setting unit that configures attribute information that prescribes a handling of the image data;

a registration unit that associates the image data and the attribute information, and registers the image data and the attribute information in the folder within the image data processing apparatus; and an output parameter input unit that inputs an output parameter used when image data to be registered is output by an outputting unit of the image data processing apparatus, wherein the registration unit appends the attribute information to the output parameter, and registers the image data and the output parameter in the folder within the image data processing apparatus.

2. An image data processing apparatus, comprising:
a memory that has a plurality of folders, and stores in any of the folders image data and attribute information that prescribes a handling of the image data while associating the image data and the attribute information;
a controller that, in response to a user instruction to output the image data stored in any of the folders, controls the handling of the image data based on the attribute information; and
an outputting unit that prints the an image based on the image data on a recording paper,
wherein the attribute information is information regarding whether or not printing by the outputting unit of the image onto the recording paper is prohibited, and the controller controls, in response to the user instruction to output image data by the outputting unit, whether or not output is prohibited based on the attribute information.

3. An image data processing apparatus comprising:
a memory that has a plurality of folders, and stores in any of the folders image data and attribute information that prescribes a handling of the image data while associating the image data and the attribute information;
a controller that, in response to a user instruction to output the image data stored in any of the folders, controls the handling of the image data based on the attribute information; and
an outputting unit that transmits image data to an external recipient,
wherein the attribute information is information regarding whether or not the transmission of image data to the external recipient by the outputting unit is prohibited and the controller controls, in response to the user instruction to output image data by the outputting unit, whether or not output is prohibited based on the attribute information.

4. An image data processing apparatus comprising:
a memory that has a plurality of folders, and stores in any of the folders image data and attribute information that prescribes a handling of the image data while associating the image data and the attribute information;
a controller that, in response to a user instruction to output the image data stored in any of the folders, controls the handling of the image data based on the attribute information; and
an outputting unit that outputs the image data based on a output parameter,
wherein the attribute information is information regarding whether or not the output of the image data by the outputting unit is prohibited and the attribute information is appended to the output parameter, and the controller controls, in response to the user instruction to output image data by the outputting unit, whether or not output is prohibited based on the attribute information.

* * * * *